United States Patent [19]

Jackson

[11] E Re. 30,944

[45] Reissued May 25, 1982

[54] CONTINUOUS FERMENTATION PROCESS AND APPARATUS

[75] Inventor: Melbourne L. Jackson, Moscow, Id.

[73] Assignee: Research Corporation, New York, N.Y.

[21] Appl. No.: 44,114

[22] Filed: May 30, 1979

Related U.S. Patent Documents

Reissue of:

[64] Patent No.: 4,069,149
Issued: Jan. 17, 1978
Appl. No.: 686,297
Filed: May 14, 1976

[51] Int. Cl.[3] ..... C02F 3/02; C02F 1/24

[52] U.S. Cl. ..... 210/608; 210/221.1; 210/221.2; 210/625; 210/703

[58] Field of Search ..... 210/13, 44, 221 P, 703, 210/221.1, 221.2, 608, 625

[56] References Cited

U.S. PATENT DOCUMENTS

| | | | |
|---|---|---|---|
| 3,246,885 | 4/1966 | Stevens | 210/221 P |
| 3,390,076 | 6/1968 | Dubach | 210/221 P |
| 3,542,675 | 11/1970 | Mail | 210/221 P |
| 3,574,331 | 4/1971 | Kurosawa | 210/219 |
| 3,576,738 | 4/1971 | Duffy | 210/44 |
| 3,725,264 | 4/1973 | Wheeler | 210/44 |
| 3,772,187 | 11/1973 | Othmer | 210/50 X |

OTHER PUBLICATIONS

*New Civil Engineer,* Apr. 17, 1975 (reprint), reported by Brian Appleton.

Institution of Chemical Engineers at York on Apr. 16/17, 1975, "Deep Shaft Aeration Process for Effluent Treatment", reported by D. A. Hines et al.

D. E. Severeid, Tappi, 62 (2), 61-63 (Feb. 1979).

M. Nagashio et al., Chemical Technology, 33(10), 927-932 (1969), English translation provided.

W. Wesley Eckenfelder, Jr., "Water Quality Engineering for Practicing Engineers," 124-125, Barnes & Noble, New York, 1970.

Metcalf & Eddy, "Wastewater Engineering", 296-298, 490, 491, 518, 532, 591, McGraw-Hill, New York, 1972.

"Process Design Techniques for Industrial Waste Treatment", by Associated Water and Air Resources Engineers, Inc., 5, 6, Enviro Press, Nashville, 1974.

"EPA Sludge Treatment and Disposal Manual", EPA 625/1-74-006, Table 4-5, Oct. 1974.

"Dissolved Air Flotation in the Waste Activate Sludge Process", a study by the National Council of the Paper Industry for Air and Stream Improvement, Packaging Corporation of America, Filer City, Mich., 1975.

A. H. King et al., "Air Flotation-Biological Oxidation of Synthetic Rubber and Latex Wastewater", publication prepared for Office of Research and Development, U.S. Environmental Protection Agency, Project 12110 GLP, Program Element 1BB036, pp. ii, iii, v, vi, 29-34, 36, for sale by the Superintendent of Documents, U.S. Printing Office, Washington, D.C., 1973.

W. W. Eckenfelder et al., "Biological Waste Treatment, 107-112, Pergamon Press, New York, 1961.

"Process Design Manual for Suspended Solids Removal", EPA 625/1-75-003a, U.S. Environmental Protection Agency, iii, v, 7-23, 7-24, 7-26, Jan. 1975.

I. J. Urza et al., Ind. Eng. Chem., Process Des. Dev., 14(2), 106-113 (1975).

*Primary Examiner*—Sidney Marantz

*Attorney, Agent, or Firm*—Cushman, Darby & Cushman

[57] ABSTRACT

A deep tank reactor is utilized for fermentation of waste liquid or other liquid in a biological reaction resulting in a solid cellular material. The resulting solid material, which is in suspension, is initially separated from the bulk of the liquid by a gaseous flotation process, using the dissolved gas in the liquid as the source of gaseous bubbles for flotation purposes.

6 Claims, 2 Drawing Figures

CONTINUOUS FERMENTATION PROCESS AND APPARATUS

Matter enclosed in heavy brackets [ ] appears in the original patent but forms no part of this reissue specification; matter printed in italics indicates the additions made by reissue.

This disclosure is concerned with a specific combination of a deep tank fermentation system and a flotation system for initial separation of the resulting solid material and liquid materials. Contrary to most flotation systems, this arrangement requires no external air supply to operate the flotation apparatus. The required gaseous bubbles are created by depressurizing the liquid in the resulting suspension that is produced in the deep tank reactor.

The feasibility of deep tank reactors for fermentation processes is generally described in U.S. Pat. No. 3,574,331, granted to Kurosawa on Apr. 13, 1971. In general, the use of a deep tank for treatment of a slurry of sewage or industrial waste is described in that patent. The slurry absorbs oxygen and is strongly agitated by air discharged into the tank. The use of a deep tank and resulting increased hydrostatic pressures increases the rate of oxygen transfer in the biological process. The patent specially mentions that the high concentration of available oxygen in the waste aerated at a high pressure reduces the dwell time of the waste in the tank to produce adequate activation of the sludge when compared to conventional, relatively shallow aeration tanks where the hydrostatic pressure at the aeration nozzles is not normally higher than 5 p.s.i.g. In the patented disclosure, the sludge is removed from the top of the deep tank and cascades downwardly to a gravity settling tank.

In the present disclosure, the completely mixed contents from a deep tank are directed to a flotation tank, where the liquid pressure is suddenly decreased. This sudden depressurization of the liquid, which is then momentarily supersaturated with gas, causes the gas to form bubbles which in turn are used for flotation purposes. It is the combination of the deep tank fermentation system and the flotation system for removal of sludge which constitutes the basis for this disclosure.

The prior U.S. Pat. No. 3,542,675, which was granted Nov. 24, 1970, shows a pressurized tank for liquid that is fed to the inlet of a flotation tank and mixed with waste water in the flotation tank to thereby separate the solid contaminants from the desired water. It is not directly related to a deep tank fermentation system.

U.S. Pat. Nos. 3,576,738 to Duffy, issued Apr. 27, 1971 and U.S. Pat. No. 3,725,264 to Wheeler issued Apr. 3, 1973 show waste treatment processes where the processing of the waste water occurs in a pressurized system, the resulting liquid suspension being directed to a flotation cell through a back pressure valve. The flotation cell is maintained at atmospheric pressure and as the waste water which is saturated with gas under pressure enters the cell, the reduction in pressure causes the gas to be released from solution in the form of small bubbles which attach to oil particles, residual solids, etc. and carry them to the surface of the water in the flotation cell.

The present disclosure is unique in its combination of a deep reactor tank for fermentation, the tank being open to the atmosphere and relatively simple in both structure and operation. I have found it to be practical to use the resulting dissolved gases in the liquid as a source of gaseous bubbles for flotation separation processes.

SUMMARY OF THE INVENTION

The invention relates to continuous fermentation processes where gaseous constituents are transferred to a liquid material, which might be a waste water or liquid substrate, to carry out a biological reaction involving living organisms and thereby produce a solid cellular material and related metabolic products. The process basically involves the improvement of directing the incoming liquid material or suspension to the interior of a tall reactor tank open to atmospheric pressure and introducing an oxygen containing gas into the bottom of the reactor tank at a rate equal to or greater than that which can be consumed by the biological process. The excess gas and by-product gaseous material is then partially dissolved in the liquid and solid phase components of the agitated suspension. The resulting suspension is constantly agitated by the bubbles of excess gas. The treated liquid suspension is then transferred to a flotation tank open to the atmosphere and is suddenly depressurized as it enters the flotation tank, to cause a portion of the dissolved gas to desorb within the cell mass or externally in the liquid and effect separation of the suspended solid particles by flotation.

It is one object of this invention to devise a practical and economical arrangement for using a deep tank reactor exposed to atmospheric pressure for fermentation processes in treating waste water and similar applications.

Another object of the invention is to minimize the need for regulation of gas being supplied to the reactor by utilizing a deep tank that is open to the atmosphere rather than being pressurized.

Another object of the invention is to provide a continuous fermentation process that can be carried out economically in relatively small areas when compared to conventional aeration ponds and settling tanks.

These and further objects will be evident from the following disclosure and related drawings and claims.

DESCRIPTION OF THE PREFERRED EMBODIMENT

Deep tank treatment of waste water is described generally in U.S. Pat. No. 3,574,331, referenced above. As used herein the term "deep tank" or the term "tall reactor tank" shall refer to a tank open to atmosphere and having a liquid height of at least 30 feet. Contrary to the statements appearing in U.S. Pat. No. 3,574,331 with respect to a limiting relationship between height and tank diameter, it has been my experience that no such limiting relationship exists and that tanks of any practical diameter can be used. As will be seen below, the height of the tank does have a relationship to the proper functioning of the flotation system, and the dimensional relationship between the liquid heights and elevations of the reactor tank and the flotation tank must be calculated for any given process requirements.

The use of very deep tanks, in excess of about 30 feet, have not been employed to my knowledge in the United States for biological waste treatment wherein bacterial cells are kept in suspension and air is introduced at the bottom of the tank to provide the oxygen needed for metabolism. The unique contribution of this disclosure is the utilization of a tall reactor tank used to introduce air into the liquid material for subsequent flotation of solids in a flotation cell. Conventional flotation cells utilize an independent source of air and achieve adequate residence time in the cells by using a relatively small pressurized tank for treatment purposes. However, reported results indicate that such devices are only about half as efficient as they could be and that they are relatively expensive to utilize. The amount of air introduced to the liquid from pressurized tanks for flotation purposes is only half or less of what would be the case if the air and waste were in equilibrium at an increased pressure and the maximum amount of air possible in the liquid suspension were introduced.

Figure 1:
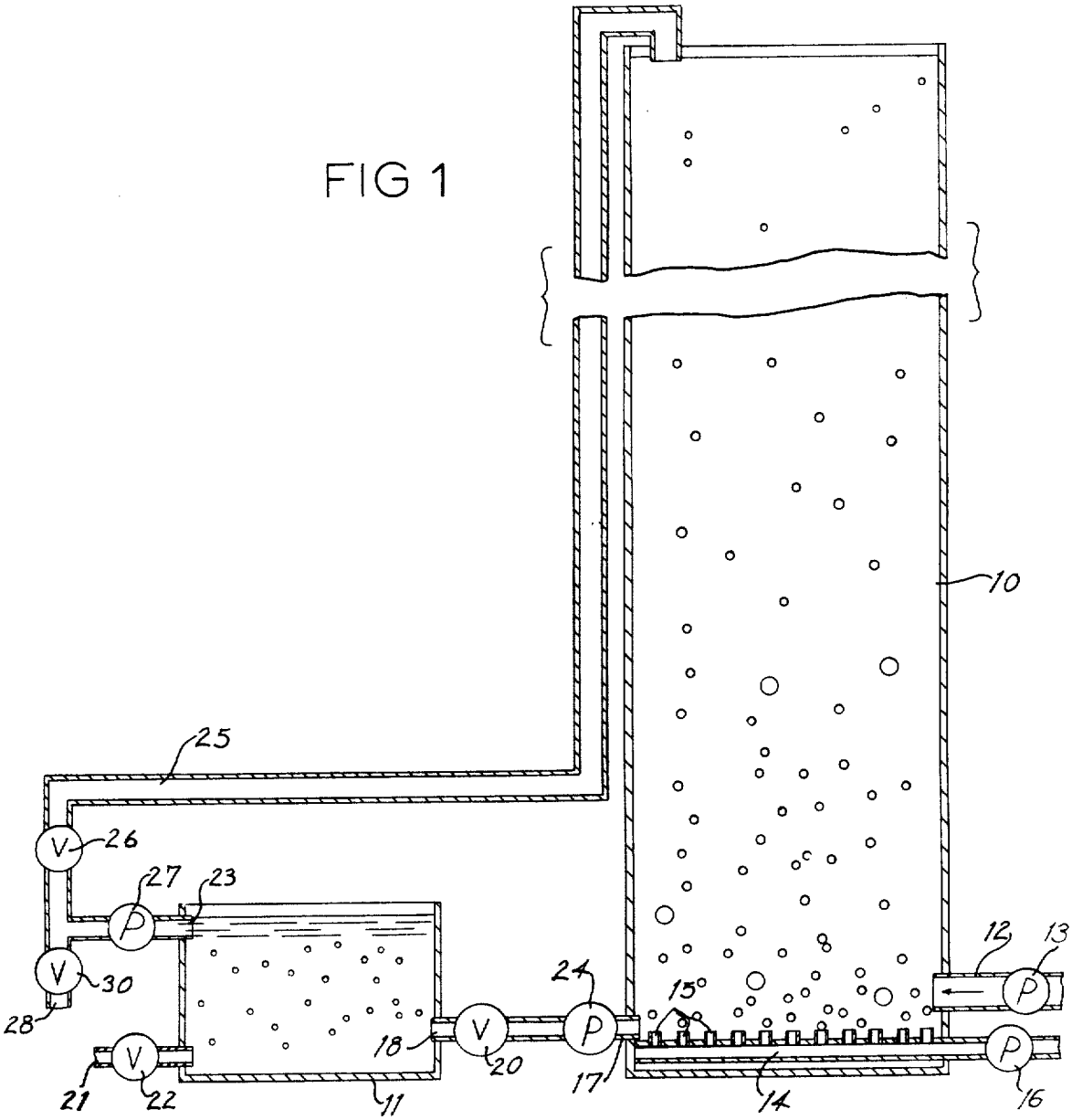
FIG. 1 is a flow diagram of the process.
Figure 2:
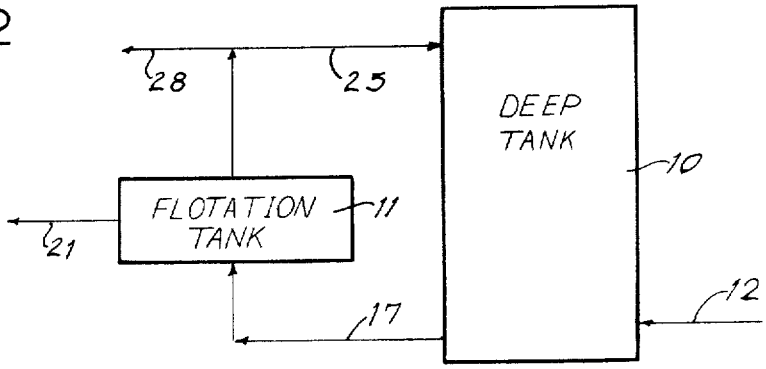
FIG. 2 is a schematic elevation view of the apparatus.

In the process diagramed in FIG. 1 and the apparatus schematically set out in FIG. 2, there is illustrated a tall reactor tank or deep tank 10 used in conjunction with a flotation tank 11. Incoming liquid material, such as waste water, is directed to the interior of tank 10 through inlet 12. The incoming liquid must be pumped to resist the pressure within the tank, or to lift it to the top of the tank if top loading is desired. This pressure is supplied by pump 13.

At the bottom of the tank 10 is an air manifold 14 having a plurality of nozzles 15 at a common plane. The manifold 14 can be a simple network of pipes arranged about the bottom of tank 10. I have found it preferable to use a large number of nozzles 15 to direct air into the tank 10 about all of the cross-sectional area of the bottom wall or floor. For instance in one deep tank having a diameter of 25 feet, 69 nozzles were spaced about the floor of the tank on 42 inch centers. Each nozzle had a one quarter inch orifice. Air is supplied to the manifold 14 by a suitable compressor 16.

Liquid material and suspended solids are drawn from the bottom of tank 10 through pipe 17 and are discharged at 18 to the interior of the flotation tank 11. A pump 24 is used when required. A suitable back pressure valve 20 is used for depressurizing the liquid during this transition. Pumping may be necessary depending on the relative deep tank and flotation tank levels.

The resulting clear liquid is drawn from tank 11 through outlet 21 and valve 22. The floating solid materials are skimmed from tank 11 through outlet 23. A pump 27 is included in outlet 23 when necessary. A portion of the solid materials can be returned to the tank 10 through a bypass 25 controlled by valve 26. Discharged solid materials are directed to outlet 28, controlled by valve 30.

The influent feed to tank 10 can be mixed with a quantity of the separated solids or sludge in tank 10. While recycling of a portion of the separated sludge is important in an activated sludge process in order to maintain the required level of biological activity in tank 10, the mixing of the solids and the influent in tank 10 is not an essential part of the process as it relates to the basic combination of a deep tank reactor and a separating flotation tank system.

The biological reactions that occur in the deep tank 10 are understood and known to those skilled in the field of waste water treatment. Microorganisms supplied within tank 10 feed on the oxygen and carbon food sources in the influent and produce solid cellular materials and related liquid and gaseous metabolic products, including carbon dioxide.

In the illustrated tank 10, the liquid and solid components within tank 10 are thoroughly mixed or agitated by the rising columns of air and gas, so that there is a constant upward and downward mixing of all components suspended within the tank. These compounds include materials in liquid, solid and gaseous phases.

The degree of gaseous saturation varies little throughout the height of the tank 10. This results because of the higher solution pressures (partial pressure of the gases) at the bottom and the rapid mixing of tank contents as the bubbles rise. At the very bottom of the tank, where the air is introduced, the liquid is not completely saturated by the gas at the pressure existing at the elevation, since the gas is preferably introduced at the bottom of tank 10. At a slightly raised elevation, the liquid approaches saturation at the pressure achieved at the particular elevation, and the liquid toward the top of tank 10 becomes supersaturated with gas. The degree of saturation depends upon the quantitative amount of gas introduced into the tank and dissolved in the liquid and upon the liquid pressure at a given location within tank 10.

The hydrostatic pressure at the bottom of tank 10 can be readily calculated with respect to the liquid height. It is well known that for each increase in liquid height of approximately 2.2 feet there will be an increase in pressure at the bottom of the tank of approximately 1 p.s.i.g. Using a minimum tank depth of 30 feet, the pressure at the bottom of tank 10 will be at least 13 p.s.i.g. As the incoming liquid from inlet 12 is aerated in the tank 10, it dissolves gaseous components of the air supplied through manifold 14, primarily nitrogen. A substantial part of the oxygen in the air supplied through manifold 14 is consumed by the biological process of treatment using suitable living organisms. Carbon dioxide produced by the system also is dissolved within the liquid. Upon release of the suspension in the flotation tank 11, which is relatively shallow compared to the substantial height of tank 10, the liquid will desorb the dissolved gasses to a degree. This produces bubbles which attach to the solid particles or are contained within the cell masses and float them to the surface of tank 11. The particles can then be removed by skimming at outlet 23.

Tests have been conducted with respect to the fermentation process in a tall tank 6 feet in diameter, with a 42 foot liquid operating depth. The tank was used to biologically treat "saveall" white water from a paper mill. Reductions in BOD of 80% or better were attained on a 24 hour cyclic feeding basis. Where nitrogen or phosphorous is required as a nutrient for the biological process, these must be separately supplied to the interior of tank 10. Separation of the activated sludge by air flotation was demonstrated first in the laboratory and later by use of a 9 foot diameter tank with a 4 foot liquid depth. The procedures were conducted on a batch basis, including flotating separation of the sludge. However, calculations indicate that a deep tank on a continuous batch should give 70 to 90% reduction in BOD, depending on the suspended solids concentrations and the time of treatment (from 2 to 7 hours). Air flotation times of ten to twenty minutes appear feasible.

Scaling these results to a 25 foot diameter tank that is 36 feet in height, continuous treatment of the same waste water indicates that flows of 0.4 to 0.8 million gallons per day could be treated.

The questions which arise concerning deep tank biological waste treatment are oxygen transfer characteristics from air, energy requirements acclimation of the bacterial cells and other organisms, separation of the cell masses termed "sludge" and items unique to the use of high hydrostatic pressures. Overall economic considerations are also of significance for large scale installations. Most of these questions have been favorably answered by written publications and studies made of deep tank processes. These are based largely upon research projects and have not yet been carried to commercial use in this country. Reported results have been concerned with deep tank research on activated sludge at 30, 60 and 85 feet liquid depths and reported removal of BOD up to 95% with no adverse effect on the microorganisms.

I have found that most any oxygen demand of a waste liquid material can be readily accommodated by a simple pipe nozzle inlet arrangement and that the tank contents are mixed readily by the constant supply of air, thereby resulting in a completely mixed system throughout the reactor tank. This has been found to be feasible even with vigorous bubbling and with both gas and liquid phases in intimate contact. The feed to the process within the reactor tank 10 can be added at any desired elevation and the treated suspension can be withdrawn also at any elevation from top to bottom. The input of air to the manifold 14 can be easily regulated to match oxygen demand in the process.

The return of depressurized sludge as illustrated in FIGS. 1 and 2 has been demonstrated to not show any irregular results. All tests to date show that there is no change in the microorganism characteristics resulting from depressurization in the flotation tank 11.

Research to date on sludge flotation by release of the dissolved gases from a tall reactor tank shows that rise rates increase with pressurization and decrease with increased sludge concentration. The two factors which affect air flotation most significantly are therefore the degree of supersaturation of available gas in the suspension and the amount of sludge to be floated.

My tests show that a fixed degree of saturation will exist for a fixed tank height and air input rate. This is due to the introduction of air through manifold 14 and the mixing of the tank contents by the rising bubbles and the gases not consumed in the biological process. At a given temperature, air rate, and height of liquid, only a constant amount of gaseous material will be dissolved in the liquid and solid components of the suspension.

A flow-through continuous system as described above is capable of achieving higher BOD reductions and better sludge densities because of external sludge separations and higher cell solids concentrations leading to shorter residence times. In a completely mixed, continuous process, the waste water is fed to the system gradually, rather than all at once as in a plug flow process, which avoids or minimizes shock loading effects.

The following table illustrates material balances for a 25 foot tank having a liquid height of 35 feet and designd for 90% reduction in BOD of waste water from a paper mill. Flow rate and concentrations are indicated at six different liquid streams. The locations of these streams are as follows: (1) incoming waste water to be treated; (2) combined feed to the deep tank 10 at either pipe 12 or return 25; (3) mixed liquor from the deep tank at outlet 17; (4) sludge return to the deep tank through supply 15; (5) sludge discharged at 28; (6) water discharged at 21. "SS" denotes suspended solids.

TABLE I

Flow Rates and Concentrates for Liquid Streams

| | | Steam Locations | | | | | |
|---|---|---|---|---|---|---|---|
| | | 1 | 2 | 3 | 4 | 5 | 6 |
| Flow | (gpm) | 300 | 430 | 430 | 130 | 25 | 275 |
| BOD | (ppm) | 200 | 146 | 20 | 20 | 20 | 20 |
| | (lb/day) | 720 | 752 | 103 | 30 | 6 | 66 |
| SS | (ppm) | 800 | 3990 | 4000 | 11440 | 11440 | 250 |
| | (lb/day) | 2884 | 20560 | 20600 | 17680 | 3360 | 824 |

The air rates and flotation conditions for the above deep tank operation at the various flow conditions are set out below in Table II.

TABLE II

Air Rates and Flotation Conditions
Influent Rate at Deep Tank

| | |
|---|---|
| Deep Tank | |
| Residence Time | 5 hrs |
| Air Flow Rate | 70 SCFM |
| Flotation Tank | |
| Residence Time | 16 min |
| Solids Loading | 115 lb/ft$^2$/day |
| Hydraulic Loading | 3430 gpd/ft$^2$ |

If the relative height of liquid in tank 10 with respect to the height of the liquid in the flotation tank 11 is selected to provide the gaseous concentration required to successfully float the concentration of solids discharged into tank 11, no pumping of the effluent from tank 10 is required. This will vary with the relative diameters of the tanks, number of flotation tanks available, the concentration of solids, and the rate of gas input. If supplementary gas is needed for flotation for lesser liquid depths it can advantageously be introduced downstream from but near pump 27.

The process and apparatus are not intended to be limited only to treatment of waste water. They are equally applicable to biological processes or reactions which result in usable solid products, such as systems for production of single cell proteins from microbiological processes carried out on liquid foods, which can be waste products or other suitable substrates. The described system is obviously applicable to any biological process where the resulting solids and/or liquid components are separated for disposal or subsequent use.

The advantages of this system of biological treatment and solid separation are enumerated below in an attempt to relate the system to prior art processes using relatively shallow treatment facilities or pressurized tanks:

1. The oxygen dissolved in activated sludge treatment is mostly consumed by metabolism although a residual is maintained and is necessary to keep the cell solids content of oxygen at the rate of consumption. There is also an effect reported for conventional aeration processes that a certain minimum oxygen content is desirable to give good solids settling characteristics. The deep tank aeration process introduces the air at the tank bottom where the pressure is greatest and therefore where oxygen is transferred to the liquid and cells at the highest rates. This is advantageous from the standpoint of preventing upsets where the consumption of oxygen exceeds the supply and the cells are adversely affected and some may die. The mixing effect introduced by the rising columns of bubbles also assists in preventing and reducing upsets as is commonly recognized in conventional treatment for what is termed the completely mixed mode of operation. The deep tank also results in much higher oxygen transfer efficiencies than for conventional basins; for example, 42% for 42-foot water depth at a higher air input rate per nozzle.

2. The deep tank provides intimate contact between suspended solids and the air dissolved in the liquid which results from transfer from the air bubbles. As such, the nitrogen content of the liquid is built up over a long period of time and approaches the maximum possible for the contact arrangement employed and the circulation of the liquid. This dissolved nitrogen is not only in the liquid adjacent to the solid cell masses but penetrates the solids to the innermost portions. Thus, when the hydrostatic pressure of the deep tank on the liquid is released the solids form nucleation sites for the desorption of the gas. It is the formation of the gas bubbles which adhere to the solid which causes the effective density of the solids to be much less than that of the water and to float to the surface. The fact that nitrogen gas in the interior of the cell masses will also desorb improves the flotation over the conventional processes where the dissolved gas is put into the liquid in a pressure tank with little time to penetrate the solid mass before release of pressure (on the order of one minute compared to hours in the deep tank).

3. In a conventional process, the introduction of air into a liquid stream containing solids in a pressurized tank is either by the straight-through process where the entire stream is subjected to air under pressure, or the recycle process where a portion of the clear, separated liquid is pressurized and returned to the incoming stream containing solids. Either of these procedures has disadvantages: the recycle process reduces the residence time in the flotation tank, or conversely requires a larger flotation tank capacity, and the straight-through process requires pressurization by pumping the liquid which may tend to break up the biological cell flocs into smaller units. The latter may be adverse to sludge separation by sedimentation.

4. The deep tank, because of the hydrostatic head, requires that the liquid input be pumped against this pressure. However, this pressure will be equal to or less than that required for pumping liquid against a pressure in a small pressurized tank to introduce the air for flotation as in conventional processes. Thus, the use of the deep tank provides economical use of the pumping energy. The pressure necessary to add the required amount of air is less than that for a conventional pressure tank because the contact time is much greater. In the conventional process, the time of contact is relatively short, on the order of a minute or so. Thus, the deep tank makes double use of the energy for pumping; for higher oxygen transfer efficiency and for dissolving gases for flotation.

5. The deep tank aeration and activated sludge process permits the processing of large quantities of wastewater in tanks which are open at the top. This is a less costly type of construction. To treat a like amount of wastewater in a lower but pressurized tank, to gain some of the advantages of higher pressure, requires closed tanks under pressure, a much more costly procedure in terms of equipment. Also, the advantage of the longer times of contact of the air bubbles, and the transfer of gases during rise, is lost for the shorter rise distances.

6. The use of deep tank aeration for activated sludge has another important benefit. It is indicated in the literature that the time of exposure of liquid to the bacteria is more to effect a flocculation of the cells for good settling characteristics than for actually removing the contaminating dissolved materials and converting them in solid cell material. This degree of flocculation should not be necessary with gas flotation where the dissolved gas is contained within the cell masses as well as in the adjacent liquid and small bubbles develop within and around each small solid particle. It is difficult to initiate bubble formation in supersaturated solutions of air gases because this involves a process known as nucleation. (A carbonated beverage or beer is supersaturated and bubbles form only at points on the walls.) Solid surfaces provide nucleation sites and the presence of the solids, no matter how small, provide points for bubble growth. Thus, gas flotation should provide good sludge separation of even the fines without the need for long aeration times in the treatment tank.

7. The deep tank permits shorter treatment times thereby effecting lower capital costs and lower operating costs. This shorter time results from the ability to use a higher concentration of reactive solids in the tank making the conversion of waste materials faster, and the possibility of not needing such a long time for flocculating the solids because settling is not the process for separation.

8. Unlike air pressurization processes, the use of the deep tank liquid directly for gas flotation provides a second gas which may assist desorption and the rising of the solids. Carbon dioxide gas is produced as a result of the biological metabolism and passes from the solids into the liquid and subsequently into the gas phase. However carbon dioxide is a much more soluble gas than either oxygen or nitrogen and will dissolve to a much greater extent. During the residence time of the liquid it is possible that the carbon dioxide will attain a condition such that the content will exceed the saturation value when the liquid is withdrawn. If so, the carbon dioxide would assist flotation and may desorb more readily. The magnitude of this effect, and whether it even occurs at all, is to be established in further experimentation currently under way. In any case, if the mixed liquor (cells plus liquid) is withdrawn from the tank bottom, some carbon dioxide within the cell masses will not have transferred to the liquid and should assist the flotation process.

9. The amount of dissolved gas needed to effect sludge separation is given in the literature as 0.02 lbs of air per lb of dissolved solids by an EPA design book and as about 0.05 by another source. This figure is based upon the flow-through or recycle addition of air in a separate pressurized tank and does not consider the high amounts of dissolved gases contained within the cell masses as obtainable in the deep tank process. The necessary figure for the deep tank has not yet been established but cells grown in a 42-foot liquid depth operation showed satisfactory separation of sludge and the development of a very clear liquid upon passing the mixed liquor from the aeration tank into a separate wider tank at a depth of about 4 feet.

A calculation for a 42-foot tank, and for a solids content of the liquor of 2000 ppm., a dissolved oxygen residual of 2 ppm., a temperature of 20° C., and a saturated nitrogen concentration at the bottom indicates that the dissolved gas content would be 35 ppm. with an air-solids ratio of $35/2000=0.018$. This is close to the EPA value for the amount of solids indicated. This does not consider that dissolved oxygen values might be higher than the minimum of 2 ppm. to be maintained in the tank, nor is any dissolution of carbon dioxide allowed for; desorption of either would add to the gas for flotation. Obviously, deeper liquid heights from taller tanks would introduce more gas into the liquid. For a 60-foot tank the A/S ratio would be 0.022 and for 80-feet would be 0.026. These values are order of magnitude correct for conventional air flotation and are more than sufficient for flotation by the deep tank procedure. Situations which produce higher solids concentrations in the aeration treatment tank would conventionally require more air but may not be necessary for the deep tank situation where the gases are contained within the cell masses. The gases may be present in quite high concentrations as outward diffusion occurs: carbon dioxide would be released, the dissolved oxygen content may be high within the solids, but nitrogen would be at near equilibrium with the bulk liquid phase.

Having described my invention, I claim:

1. In a continuous fermentation process involving transfer of gaseous constituents to a liquid material or suspension for biological reaction purposes to produce a cellular material and related metabolic products in suspension, the improvement comprising the following steps:

directing incoming liquid material or suspension to the interior of a [tall reactor] *deep* tank exposed to atmospheric pressure;

introducing an oxygen containing gas to the lower interior of the [reactor] *deep* tank at a rate equal to or greater than that required for consumption of oxygen by the biological reaction process, whereby excess gas is dissolved in the liquid phase and solid phase components of the resulting supension and whereby the resulting suspension is [contantly] *constantly* agitated by incoming bubbles of the excess gas;

maintaining the liquid and gaseous components within the [tall reactor] *deep* tank for a residence time sufficient to complete the biological reaction process[, whereby excess gas is dissolved in the liquid phase and solid phase components of the resulting suspension and whereby the resulting suspension is constantly agitated by incoming bubbles of the excess gas;

maintaining the liquid and gaseous components within the tall reactor tank for a residence time sufficient to complete the biological reaction process];

and removing liquid suspension from the [reactor] *deep* tank at a pressure greater than atmospheric pressure and directing the liquid suspension to a flotation tank exposed to atmospheric pressure, the liquid suspension being suddenly depressurized upon introduction to the flotation tank to thereby cause the dissolved gas to bubble through the liquid suspension and effect separation of the suspended solid materials by flotation.

2. A process as set out in claim 1, wherein the incoming material or suspension is wastewater and wherein microorganisms capable of feeding upon the carbonaceous materials in the wastewater are maintained within the [tall reactor] *deep* tank.

3. A process as set out in claim 1 wherein a portion of the separated solids after flotation are returned to the interior of the [tall reactor] *deep* tank to maintain an effective operational balance for the biological reaction.

4. A process as set out in claim 1 wherein the hydrostatic pressure of the liquid suspension drawn from the [reactor] *deep* tank is at least 13 p.s.i.g.

5. An apparatus for continuous fermentation processes involving transfer of gaseous constituents to a liquid material or suspension for biological reaction purposes to produce a solid cellular material and related metabolic products, comprising:

a [tall reactor] *deep* tank exposed to atmospheric pressure;

input means for supplying incoming liquid material or suspension to the interior of the [reactor] *deep* tank;

outlet means for discharging treated liquid suspensions from the interior of the [reactor] *deep* tank at a hydrostatic pressure of at least 13 p.s.i.g.;

a flotation tank exposed to atmospheric pressure and having an inlet;

means operatively connecting the outlet means of the [reactor] *deep* tank and the inlet of the flotation tank for suddenly depressurizing the liquid suspension as it is introduced to the flotation tank[;].

6. An apparatus as set out in claim 5 further comprising:

outlet means at the flotation tank for respectively discharging the separated liquid and solid components therein, including bypass means for directing a portion of the separated solids back to the [reactor] *deep* tank.

* * * * *